(12) United States Patent
Yamazaki et al.

(10) Patent No.: US 10,774,919 B2
(45) Date of Patent: Sep. 15, 2020

(54) SYSTEMS AND METHODS FOR IMPROVING DRIVELINE EFFICIENCIES OF ELECTRIFIED VEHICLES

(71) Applicant: FORD GLOBAL TECHNOLOGIES, LLC, Dearborn, MI (US)

(72) Inventors: Mark Steven Yamazaki, Canton, MI (US); Scott James Thompson, Canton, MI (US); David Crist Gabriel, Troy, MI (US); Walter Joseph Ortmann, Saline, MI (US); Christopher Alan Lear, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 517 days.

(21) Appl. No.: 15/381,603

(22) Filed: Dec. 16, 2016

(65) Prior Publication Data

US 2018/0172137 A1    Jun. 21, 2018

(51) Int. Cl.
*F16H 57/04* (2010.01)
*B60L 53/16* (2019.01)
(Continued)

(52) U.S. Cl.
CPC .......... *F16H 57/0413* (2013.01); *B60L 53/12* (2019.02); *B60L 53/16* (2019.02); *B60W 20/00* (2013.01); *F16H 57/0483* (2013.01); *B60K 6/26* (2013.01); *B60K 6/28* (2013.01); *B60K 6/365* (2013.01); *B60L 2210/40* (2013.01); *B60Y 2200/92* (2013.01); *B60Y 2400/112* (2013.01); *B60Y 2400/426* (2013.01); *B60Y 2400/432* (2013.01); *B60Y 2400/433* (2013.01); *B60Y 2400/435* (2013.01); *B60Y 2400/604* (2013.01);
(Continued)

(58) Field of Classification Search
CPC .. F16H 57/0413; F16H 57/0483; B60L 53/12; B60L 53/16; B60L 2210/40; B60L 2210/92; B60W 20/00; B60K 6/26; B60K 6/28; B60K 6/365; B60Y 2400/112; B60Y 2400/426; B60Y 2400/432; B60Y 2400/433; B60Y 2400/435; B60Y 2400/604; B60Y 2400/71; B60Y 2400/81; Y02T 10/7005; Y02T 10/7072; Y02T 10/7241; Y02T 90/127; Y02T 90/14; Y10S 903/905; Y10S 903/906; Y10S 903/907; Y10S 903/91
See application file for complete search history.

(56) References Cited

U.S. PATENT DOCUMENTS 3,134,374 A    5/1964   Stevens
3,564,199 A    2/1971   Blahn
(Continued)

FOREIGN PATENT DOCUMENTS

CN     103422938 A    12/2013
DE     3737390 A1     5/1989
(Continued)

*Primary Examiner* — Shawntina T Fuqua
(74) *Attorney, Agent, or Firm* — David B. Kelley; Carlson, Gaskey & Olds

(57) ABSTRACT

An electrified vehicle includes a transmission system including a differential and an electrically powered heating device configured to selectively warm a differential fluid of the differential. The electrically powered heating device is selectively powered to warm the differential fluid.

26 Claims, 5 Drawing Sheets

(51) Int. Cl.
  *B60L 53/12* (2019.01)
  *B60W 20/00* (2016.01)
  *B60K 6/26* (2007.10)
  *B60K 6/28* (2007.10)
  *B60K 6/365* (2007.10)

(52) U.S. Cl.
  CPC ....... *B60Y 2400/71* (2013.01); *B60Y 2400/73* (2013.01); *B60Y 2400/80* (2013.01); *B60Y 2400/81* (2013.01); *Y02T 10/7005* (2013.01); *Y02T 10/7072* (2013.01); *Y02T 10/7241* (2013.01); *Y02T 90/122* (2013.01); *Y02T 90/127* (2013.01); *Y02T 90/14* (2013.01); *Y10S 903/905* (2013.01); *Y10S 903/906* (2013.01); *Y10S 903/907* (2013.01); *Y10S 903/91* (2013.01)

(56) References Cited

U.S. PATENT DOCUMENTS

| | | |
|---|---|---|
| 5,803,863 A | 9/1998 | Hayward et al. |
| 7,022,943 B1 | 4/2006 | Barta |
| 7,637,337 B2 | 12/2009 | Stanges |
| 7,683,582 B2 | 3/2010 | Zhu et al. |
| 8,088,034 B2 | 1/2012 | Imamura et al. |
| 8,205,709 B2 | 6/2012 | Gooden et al. |
| 8,251,851 B2 | 8/2012 | Beattie, Jr. |
| 8,418,799 B2 | 4/2013 | Richter et al. |
| 8,663,066 B2 | 3/2014 | Thomas et al. |
| 8,800,521 B2 | 8/2014 | Hawkins et al. |
| 8,933,372 B2 | 1/2015 | King |
| 9,631,547 B2 * | 4/2017 | Porras ...................... F01P 7/165 |
| 2007/0024244 A1 | 2/2007 | Zhu et al. |
| 2008/0178830 A1 * | 7/2008 | Sposato ................. F01M 5/021 |
| | | 123/142.5 E |
| 2011/0153140 A1 | 6/2011 | Datta et al. |
| 2012/0125278 A1 | 5/2012 | Ries-Mueller |
| 2012/0168138 A1 * | 7/2012 | Myers ................. F02B 29/0475 |
| | | 165/200 |
| 2012/0175358 A1 * | 7/2012 | Davidson, Jr. ......... F01M 5/001 |
| | | 219/202 |
| 2013/0206744 A1 | 8/2013 | King |
| 2013/0213335 A1 * | 8/2013 | Thomas ................... B60L 1/12 |
| | | 123/142.5 R |
| 2014/0142819 A1 | 5/2014 | Pursifull et al. |
| 2014/0161431 A1 | 6/2014 | Oh |
| 2014/0191049 A1 * | 7/2014 | Huyghe ............... B60H 1/2225 |
| | | 237/45 |
| 2015/0108112 A1 | 4/2015 | Gries |
| 2016/0332520 A1 * | 11/2016 | Miller ...................... B60L 1/02 |

FOREIGN PATENT DOCUMENTS

| | | |
|---|---|---|
| DE | 19823254 A1 | 12/1999 |
| DE | 10332497 A1 | 2/2005 |
| DE | 102005062338 A1 | 6/2007 |
| GB | 609147 | 9/1948 |
| JP | 2008296611 A | 12/2008 |
| JP | 2012159173 A | 8/2012 |

\* cited by examiner

SYSTEMS AND METHODS FOR IMPROVING DRIVELINE EFFICIENCIES OF ELECTRIFIED VEHICLES

TECHNICAL FIELD

This disclosure relates to vehicle systems and methods for improving driveline efficiencies of electrified vehicles. An exemplary vehicle system includes an electrically powered heating device configured to condition differential fluid if certain vehicle conditions are met.

BACKGROUND

The need to reduce automotive fuel consumption and emissions is well known. Therefore, vehicles are being developed that reduce reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

Electrified vehicles can present unique thermal management challenges. For example, achieving desired thermal operating levels of various components of the electrified vehicle must be balanced against maximizing the fuel economy and/or electric range of the electrified vehicle.

SUMMARY

An electrified vehicle according to an exemplary aspect of the present disclosure includes, among other things, a transmission system including a differential and an electrically powered heating device configured to selectively warm a differential fluid of the differential.

In a further non-limiting embodiment of the foregoing electrified vehicle, the electrically powered heating device is in direct contact with the differential fluid inside the differential.

In a further non-limiting embodiment of either of the foregoing electrified vehicles, the electrically powered heating device includes a positive temperature coefficient (PTC) heater.

In a further non-limiting embodiment of any of the foregoing electrified vehicles, the electrically powered heating device includes an infrared heating device.

In a further non-limiting embodiment of any of the foregoing electrified vehicles, the electrically powered heating device includes a resistive heating device.

In a further non-limiting embodiment of any of the foregoing electrified vehicles, the electrically powered heating device includes a probe that extends into a sump of the differential.

In a further non-limiting embodiment of any of the foregoing electrified vehicles, a control unit is configured to selectively command actuation of the electrically powered heating device.

In a further non-limiting embodiment of any of the foregoing electrified vehicles, the electrically powered heating device is powered by grid power.

In a further non-limiting embodiment of any of the foregoing electrified vehicles, the electrically powered heating device is powered by a battery.

In a further non-limiting embodiment of any of the foregoing electrified vehicles, the electrically powered heating device is mounted within a drain plug of the differential.

A method according to another exemplary aspect of the present disclosure includes, among other things, selectively powering an electrically powered heating device to generate heat and warming a differential fluid of a differential of an electrified vehicle with the heat generated by the electrically powered heating device.

In a further non-limiting embodiment of the foregoing method, powering the electrically powered heating device includes powering the electrically powered heating device using a battery of the electrified vehicle.

In a further non-limiting embodiment of either of the foregoing methods, powering the electrically powered heating device includes powering the electrically powered heating device using grid power during an on-plug condition of the electrified vehicle.

In a further non-limiting embodiment of any of the foregoing methods, warming the differential fluid is continued until a temperature of the differential fluid is within a desired operating temperature range.

In a further non-limiting embodiment of any of the foregoing methods, the method includes, prior to powering the electrically powered heating device, determining whether a temperature of the differential exceeds a predefined temperature threshold.

In a further non-limiting embodiment of any of the foregoing methods, the method includes, prior to powering the electrically powered heating device, determining if a state of charge of a battery exceeds a predefined charge threshold, determining if a vehicle speed is greater than zero, and determining if a driver demanded power is below a maximum amount of power available.

In a further non-limiting embodiment of any of the foregoing methods, the method includes, prior to powering the electrically powered heating device, determining whether the electrified vehicle is on-plug and in a pre-drive warm-up cycle.

In a further non-limiting embodiment of any of the foregoing methods, the method includes, prior to powering the electrically powered heating device, determining whether a temperature of the differential exceeds a predefined temperature threshold, and determining whether power is available from an external power source for powering the electrically powered heating device.

In a further non-limiting embodiment of any of the foregoing methods, the method includes determining a maximum amount of power to be applied to the electrically powered heating device.

In a further non-limiting embodiment of any of the foregoing methods, the method includes controlling the electrically powered heating device via a variable voltage or fixed voltage duty cycle to heat the differential fluid at a desired level for a desired amount of time.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes vehicle systems and methods for conditioning differential fluids of electrified vehicle differentials if certain vehicle conditions have been met. These and other features are described in greater detail in the following paragraphs of this detailed description.

Figure 1:
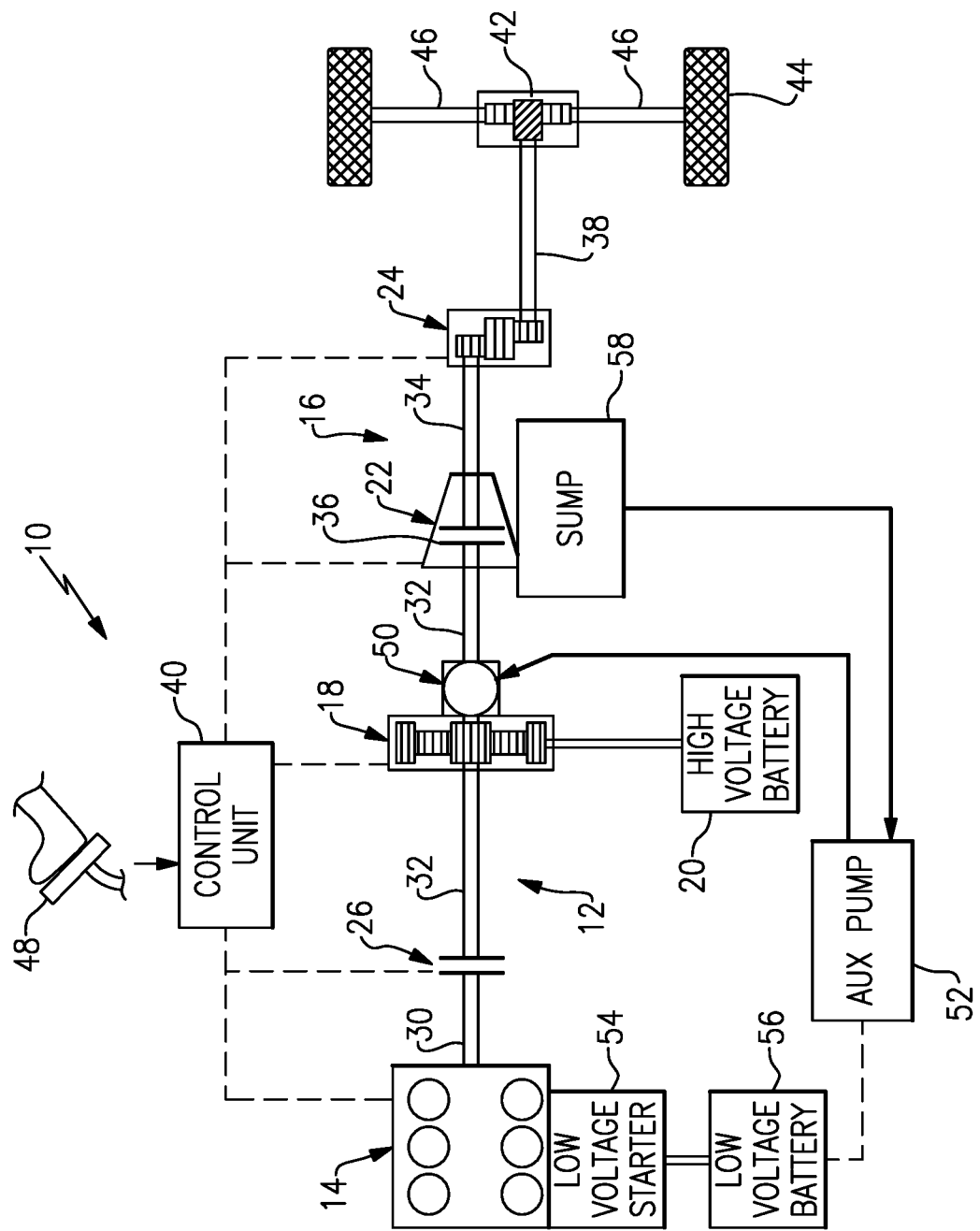
FIG. 1 schematically illustrates a powertrain of an electrified vehicle.

FIG. 1 schematically illustrates an electrified vehicle 10. Although illustrated as a hybrid electric vehicle (HEV) in some embodiments, the present disclosure may be applicable any type of electrified vehicle, including but not limited to full hybrid electric vehicles (FHEV's) and plug-in hybrid electric vehicles (PHEV's). In addition, although a specific component relationship is illustrated in FIG. 1, this illustration is not intended to limit this disclosure. In other words, it should be readily understood that the placement and orientation of the various components of the electrified vehicle 10 could vary within the scope of this disclosure.

The exemplary electrified vehicle 10 includes a powertrain 12. The powertrain 12 includes an engine 14 and a transmission system 16 that is selectively driven by the engine 14. In a non-limiting embodiment, the transmission system 16 is a modular hybrid transmission (MHT). The transmission system 16 can include an electric machine 18 powered by a high voltage battery 20, a torque converter 22, and a multiple-step ratio automatic transmission, or gearbox 24. In another non-limiting embodiment, the electric machine 18 is configured as an electric motor. However, the electric machine 18 could alternatively be configured as a generator or a combined motor/generator within the scope of this disclosure.

The engine 14 and the electric machine 18 may both be employed as available drive sources for the electrified vehicle 10. The engine 14 generally represents a power source that may include an internal combustion engine such as a gasoline, diesel, or natural gas powered engine, or a fuel cell. The engine 14 generates power and corresponding torque that is supplied to the electric machine 18 when an engine disconnect clutch 26 that is disposed between the engine 14 and the electric machine 18 is engaged.

In some embodiments, the engine 14 is started using the electric machine 18 to rotate the engine 14 using torque provided through the engine disconnect clutch 26. Alternatively, the electrified vehicle 10 may be equipped with a low voltage starter 54 operatively connected to the engine 14, for example, through a belt or gear drive. The starter 54 may be used to provide torque to start the engine 14 without the addition of torque from the electric machine 18. The starter 54 may be powered by the high voltage battery 20, or the electrified vehicle 10 can include a low voltage battery 56 to provide power to the starter 54 and/or other vehicle components.

The electric machine 18 may be any one of a plurality of types of electric machines. By way of one non-limiting embodiment, the electric machine 18 could be a permanent magnet synchronous motor.

When the engine disconnect clutch 26 is at least partially engaged, power flow from the engine 14 to the electric machine 18 or from the electric machine 18 to the engine 14 is possible. For example, the engine disconnect clutch 26 may be engaged and the electric machine 18 may operate as a generator to convert rotational energy provided by a crankshaft 30 and an electric machine shaft 32 into electrical energy to be stored in the battery 20. The engine disconnect clutch 26 can also be disengaged to isolate the engine 14 from the remainder of the powertrain 12 such that the electric machine 18 can act as the sole power source for propelling the electrified vehicle 10.

The electric machine shaft 32 may extend through the electric machine 18. The electric machine 18 is continuously drivably connected to the electric machine shaft 32, whereas the engine 14 is drivably connected to the electric machine shaft 32 only when the engine disconnect clutch 26 is at least partially engaged.

The electric machine 18 is connected to the torque converter 22 via the electric machine shaft 32. The torque converter 22 is therefore connected to the engine 14 when the engine disconnect clutch 26 is at least partially engaged. The torque converter 22 includes an impeller fixed to the electric machine shaft 32 and a turbine fixed to a transmission input shaft 34. The torque converter 22 thus provides a hydraulic coupling between the electric machine shaft 32 and the transmission input shaft 34.

The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 36 may also be provided. When engaged, the torque converter bypass clutch 36 frictionally or mechanically couples the impeller and the turbine of the torque converter 22 to enable a more efficient power transfer. The torque converter bypass clutch 36 may be operated as a launch clutch to provide smooth vehicle launch. Alternatively, or in combination, a launch clutch similar to the engine disconnect clutch 26 may be provided between the electric machine 18 and the transmission gearbox 24 for applications that do not include a torque converter 22 or a torque converter bypass clutch 36. In some embodiments, the engine disconnect clutch 26 is generally referred to as an upstream clutch and the torque converter bypass clutch 36 (which may be a launch clutch) is generally referred to as a downstream clutch.

The transmission gearbox 24 may include gear sets (not shown) that are selectively operated using different gear ratios by selective engagement of friction elements such as clutches, planetary gears, and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 34. The transmission gearbox 24 may be automatically shifted from one ratio to another based on various vehicle and ambient operating conditions by an associated controller. The transmission gearbox 24 then provides powertrain output torque to the transmission output shaft 38.

It should be understood that the hydraulically controlled transmission gearbox 24 used with a torque converter 22 is but a non-limiting embodiment of a gearbox or transmission arrangement and that any multiple ratio gearbox that accepts input torque(s) from an engine and/or a motor and then provides torque to an output shaft at the different ratios is acceptable for use with the embodiments of this disclosure. For example, the transmission gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

The transmission output shaft 38 may be connected to a differential 42. The differential 42 may also be referred to as a final drive. The differential 42 drives a pair of wheels 44 via respective axles 46 that are connected to the differential 42. In one embodiment, the differential 42 transmits approximately equal torque to each wheel 44 while permitting slight speed differences such as when the vehicle turns a corner. Different types of differentials or similar devices may be used to distribute torque from the powertrain 12 to one or more wheels 44. In some applications, torque distribution may vary depending on the particular operating mode or condition, for example.

Pressurized fluid for the transmission system 16 may be provided by a transmission pump 50. The transmission pump 50 may be connected to or adjacent to the electric machine 18 such that it rotates with the electric machine 18 and the electric machine shaft 32 to pressurize and provide sufficient line pressure for full operation of the transmission gearbox 24. When the portion of the electric machine shaft 32 containing the transmission pump 50 is at rest, the transmission pump 50 is also at rest and is inactive.

In order to provide pressurized transmission fluid when the transmission pump 50 is inactive, an auxiliary pump 52 can also be provided. The auxiliary pump 52 may be electrically powered, for example by the low voltage battery 56. In some embodiments, the auxiliary pump 52 provides a portion of the transmission fluid for the transmission gearbox 24 such that the transmission gearbox 24 is limited in operation, for example to certain actuators or gearing ratios, when the auxiliary pump 52 is operating.

Cooled transmission fluid, such as oil, may settle in a sump 58 from the torque converter 22. The auxiliary pump 52 may pump transmission fluid from the sump 58 to the transmission pump 50 during certain conditions.

The powertrain 12 may additionally include an associated control unit 40. While schematically illustrated as a single controller, the control unit 40 may be part of a larger control system and may be controlled by various other controllers throughout the electrified vehicle 10, such as a vehicle system controller (VSC) that includes a powertrain control unit, a transmission control unit, an engine control unit, etc. It should therefore be understood that the control unit 40 and one or more other controllers can collectively be referred to as a "control unit" that controls, such as through a plurality of interrelated algorithms, various actuators in response to signals from various sensors to control functions such as starting/stopping the engine 14, operating the electric machine 18 to provide wheel torque or charge the battery 20, selecting or scheduling transmission shifts, actuating the engine disconnect clutch 26, etc. In one embodiment, the various controllers that make up the VSC may communicate with one another using a common bus protocol (e.g., CAN).

The control unit 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The control unit 40 may also communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

As schematically illustrated in FIG. 1, the control unit 40 may communicate signals to and/or from the engine 14, the engine disconnect clutch 26, the electric machine 18, the torque converter bypass clutch 36, the transmission gearbox 24, and/or other components. Although not explicitly illustrated, those of ordinary skill in the art will recognize various functions or components that may be controlled by the control unit within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for engine disconnect clutch 26, torque converter bypass clutch 36, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 36 status (TCC), deceleration or shift mode, for example.

Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 48 may be used by the driver of the electrified vehicle 10 to provide a demanded torque, power, or drive command to propel the electrified vehicle 10. In general, depressing and releasing the accelerator pedal 48 generates an accelerator pedal position signal that may be interpreted by the control unit 40 as a demand for increased power or decreased power, respectively. Based at least upon input from the accelerator pedal 48, the control unit 40 commands torque from the engine 14 and/or the electric machine 18. The control unit 40 also controls the timing of gear shifts within the transmission gearbox 24, as well as engagement or disengagement of the engine disconnect clutch 26 and the torque converter bypass clutch 36. Like the engine disconnect clutch 26, the torque converter bypass clutch 36 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 36 may be operated as locked or open without using a modulated operating mode depending on the particular application.

To drive the electrified vehicle 10 with the engine 14, the engine disconnect clutch 26 is at least partially engaged to transfer at least a portion of the engine torque through the engine disconnect clutch 26 to the electric machine 18, and then from the electric machine 18 through the torque converter 22 and the transmission gearbox 24. The electric machine 18 may assist the engine 14 by providing additional power to turn the electric machine shaft 32. This operation mode may be referred to as a "hybrid mode" or an "electric assist mode."

To drive the electrified vehicle 10 using the electric machine 18 as the sole power source, the power flow remains the same except the engine disconnect clutch 26 isolates the engine 14 from the remainder of the powertrain 12. Combustion in the engine 14 may be disabled or otherwise turned OFF during this time to conserve fuel. The power electronics (not shown) may convert DC voltage from the battery 20 into AC voltage to be used by the electric machine 18. The control unit 40 commands the power electronics to convert voltage from the battery 20 to an AC voltage provided to the electric machine 18 to provide positive or negative torque to the electric machine shaft 32. This operation mode may be referred to as an "electric only" or "EV" operation mode.

In any mode of operation, the electric machine 18 may act as a motor and provide a driving force for the powertrain 12. Alternatively, the electric machine 18 could act as a generator and convert kinetic energy from the electrified vehicle 10 into electric energy to be stored in the battery 20. The electric machine 18 may act as a generator while the engine 14 is providing propulsion power for the electrified vehicle 10, for example. The electric machine 18 may additionally act as a generator during times of regenerative braking in which rotational energy from spinning the wheels 44 is transferred back through the transmission gearbox 24 and is converted into electrical energy for storage in the battery 20.

It should be understood that highly schematic depiction of FIG. 1 is merely exemplary and is not intended to be limiting on this disclosure. Other configurations are additionally or alternatively contemplated.

Figure 2:
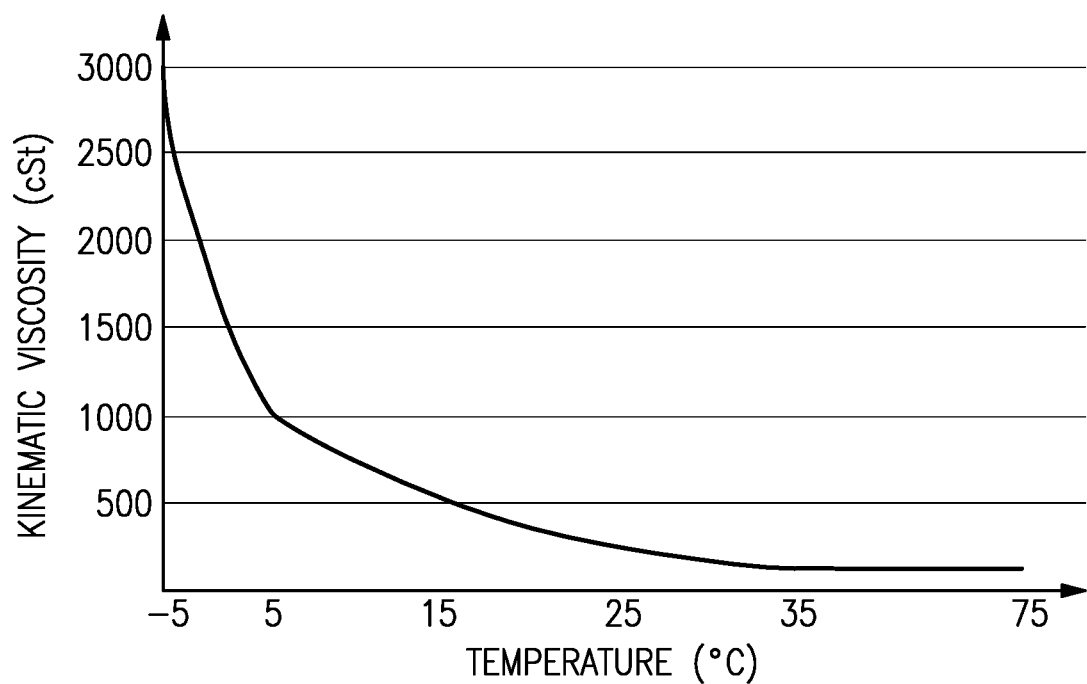
FIG. 2 is a graph that illustrates the effect of temperature on the viscosity of a differential fluid.

A differential fluid is typically used to lubricate the gears and other components of the differential 42. As shown in FIG. 2, the viscosity of the differential fluid significantly increases as ambient temperatures drop. Spin losses and turning losses within the differential 42 increase as the differential fluid becomes more viscous. Thus, it may be desirable to maintain the temperature of the differential fluid above a certain threshold temperature in order to improve the driveline efficiency of the electrified vehicle 10. Exemplary systems and methods for conditioning the differential fluid of the differential 42 are detailed herein.

Figure 3:
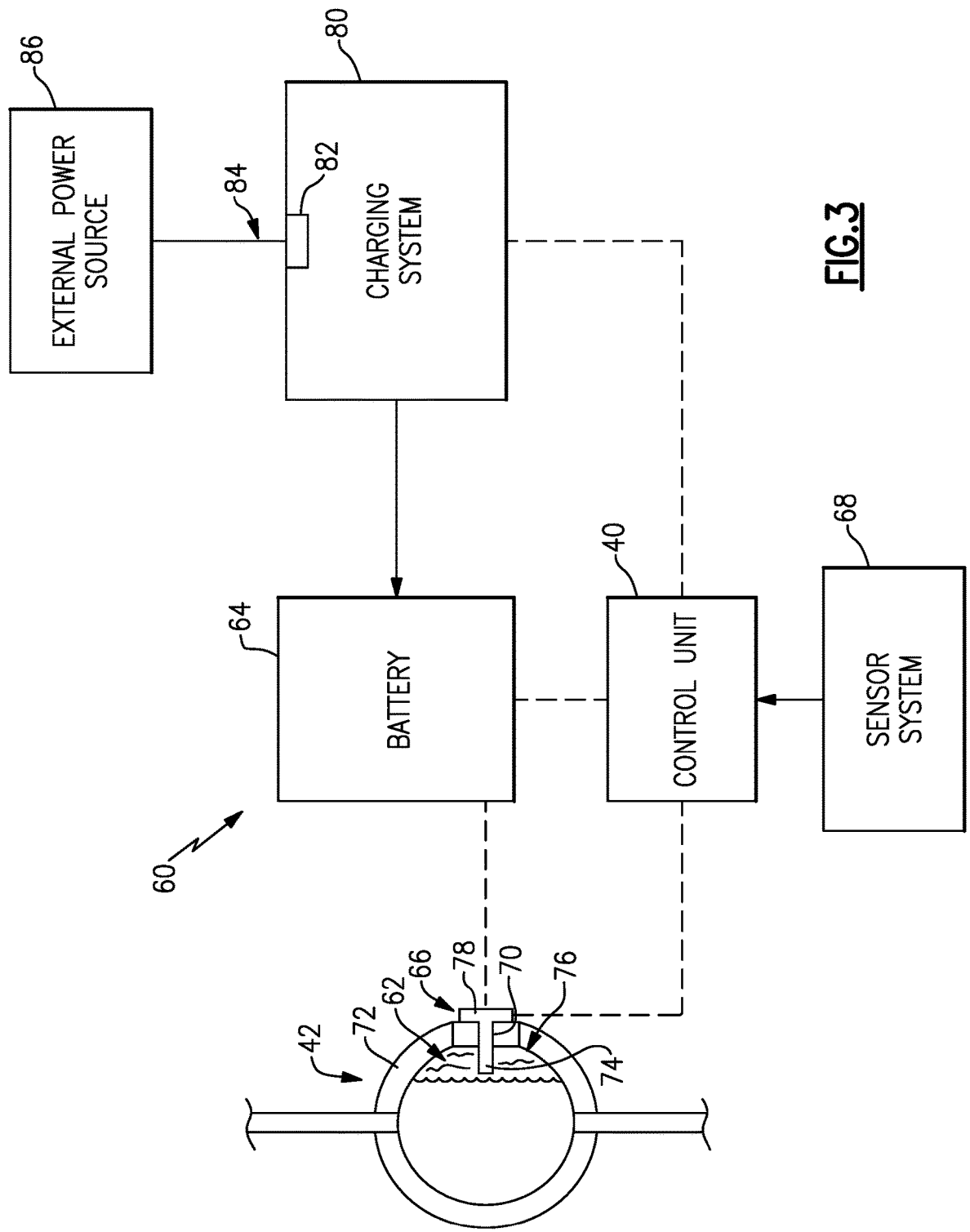
FIG. 3 illustrates a vehicle system of an electrified vehicle.

FIG. 3 is a highly schematic depiction of a vehicle system 60 that may be employed by an electrified vehicle, such as the electrified vehicle 10 of FIG. 1. The various components of the vehicle system 60 are shown schematically to better illustrate the features of this disclosure. These components, however, are not necessarily depicted in the exact locations where they would be found in an actual vehicle and are not necessarily shown to scale.

The vehicle system 60 is adapted to schedule and effectuate the conditioning of a differential fluid 62 of the differential 42 either during operation of the electrified vehicle 10 (e.g., for FHEV or PHEV embodiments) or prior to a next expected usage time of the electrified vehicle 10 (e.g., for PHEV embodiments). In a non-limiting embodiment, the differential fluid 62 is heated as quickly as possible to achieve an optimal operating temperature of the differential 42. Conditioning the differential fluid 62 during certain conditions may improve fuel efficiency, durability, and overall driveline efficiencies of the electrified vehicle 10, among other potential benefits.

The exemplary vehicle system 60 may include the differential 42, a battery 64, a heating device 66, a sensor system 68, and the control unit 40. The differential 42 houses the differential fluid 62, which has an optimal operating range. Although not specifically shown by the highly schematic depiction of FIG. 3, the differential 42 includes a series of gears that function to allow the outer drive wheel to rotate faster than the inner drive wheel during a turn. The differential fluid 62 lubricates the gears of the differential 42. Although a single differential 42 is shown, the vehicle system 60 could include one or more differentials 42. For example, four-wheel drive electrified vehicles could include two differentials.

The battery 64 may include one or more battery assemblies having a plurality of battery cells or other energy storage devices. The energy storage devices of the battery 64 store electrical energy that is selectively supplied to power various electrical loads residing on-board the electrified vehicle 10. These electrical loads may include various high voltage loads (e.g., electric machines, etc.) or various low voltage loads (e.g., lighting systems, low voltage batteries, logic circuitry, etc.). In a first non-limiting embodiment, the battery 64 is a high voltage traction battery pack (see, e.g., high voltage battery 20 of FIG. 1). In another non-limiting embodiment, the battery 64 is a low voltage battery, such as a 12 V battery (see, e.g., low voltage battery 56 of FIG. 1). In another non-limiting embodiment, the vehicle system 60 is equipped with both a high voltage battery and a low voltage battery.

One or more electrically powered heating devices 66 (only one shown in FIG. 3) are positioned relative to the differential 42. The heating device 66 is configured to condition the differential fluid 62 housed and circulated inside the differential 42, such as by warming it.

In a first non-limiting embodiment, the heating device 66 is a positive temperature coefficient (PTC) heater positioned in direct contact with the differential fluid 62. In a second non-limiting embodiment, the heating device 66 is an infrared heating device configured to generate heat for warming the transmission fluid 62. In a third non-limiting embodiment, the heating device 66 is a resistive heating device. The heating device 66 could be either a high voltage device or a low voltage device and may be selected such that its maximum regulating temperature is within the optimal operating temperature range of the differential fluid 62.

In a non-limiting embodiment, the heating device 66 is powered by the battery 64 during operation of the electrified vehicle 10. In another non-limiting embodiment, the heating device 66 is powered by a self-contained energy storage device, such as a separate battery or special reserve power supply. In yet another non-limiting embodiment, as discussed in greater detail below, the heating device 66 is powered by grid power if the electrified vehicle 10 is a PHEV and is "on-plug" (i.e., plugged into an external power source when the vehicle is OFF).

The heating device 66 may be mounted at various locations in relation to the differential 42. For example, in a non-limiting embodiment, the heating device 66 is inserted through a drain hole 70 of a casing 72 of the differential 42. A probe 74 of the heating device 66 may extend inside the differential 42 such that it is in direct contact with the differential fluid 62. In a non-limiting embodiment, the probe 74 extends into a sump 76 of the differential 42. The differential fluid 62 may accumulate within the sump 76. A boss 78 marks the mounting location at which the heating device 66 is fitted into the casing 72. Other mounting locations are also contemplated within the scope of this disclosure.

The sensor system 68 may include one or more sensors adapted to sense various operating conditions associated with the electrified vehicle 10. In a non-limiting embodiment, the sensor system 68 monitors ambient temperatures, the temperature of the differential 42, vehicle speed, the state of charge (SOC) of the battery 64, the amount of power requested by the vehicle driver/operator, etc. Activation of the heating device 66 may depend on these and potentially other vehicle parameters.

The control unit 40 includes executable instructions for interfacing with and commanding operation of the various components of the vehicle system 60 including, but not limited to, the battery 64, the heating device 66, and the sensor system 68. The control unit 40 may include multiple inputs and outputs for interfacing with the various components of the vehicle system 60. The control unit 40 may additionally include a processing unit and non-transitory memory for executing the various control strategies and modes of the vehicle system 60.

In a non-limiting embodiment, the control unit 40 is configured to activate the heating device 66 to heat the differential fluid 62. The control unit 40 may command the heating device 66 ON when certain vehicle conditions have been met. The control unit 40 is configured to determine when to start and stop conditioning the differential 42 by controlling the heating device 66.

The control unit 40 may additionally notify the driver/operator that the battery 64 has an insufficient SOC to warm the differential fluid 62, can decide not to warm the differential fluid 62 unless the battery 64 has a sufficient SOC, and can notify the driver/operator of the amount of time that will be necessary to warm up the differential fluid 62. These are but several non-limiting examples of the many functions of the control unit 40 of the vehicle system 60.

In PHEV embodiments, the vehicle system 60 may additionally include a charging system 80. The charging system 80 may include a charging port 82 located on the electrified vehicle 10 and a cordset 84 that is operably connectable between the charging port 82 and an external power source 86. The charging port 82 is adapted to selectively receive energy from the external power source 86, via the cordset 84, and then supply the energy to the battery 64 for charging the battery cells. In another non-limiting embodiment, the charging system 80 is a wireless charging system that wirelessly transfers power from the external power source 86 to the charging port 82. If necessary, the charging system 80 may convert alternating current received from the external power source 86 to direct current for charging the battery 64. The charging system 80 is also configured to establish maximum available charging currents for charging the battery 64, among other operational parameters. The external power source 86 includes off-board power, such as utility/grid power, in a non-limiting embodiment.

In another non-limiting embodiment, power from the external power source 86 is used to power the heating device 66 to heat the differential fluid 62. The control unit 40 may command the heating device 66 ON when the electrified vehicle 10 is on-plug and an upcoming drive cycle is expected. This activation can be achieved during a programmable, pre-drive warm up cycle, for example.

Figure 4:
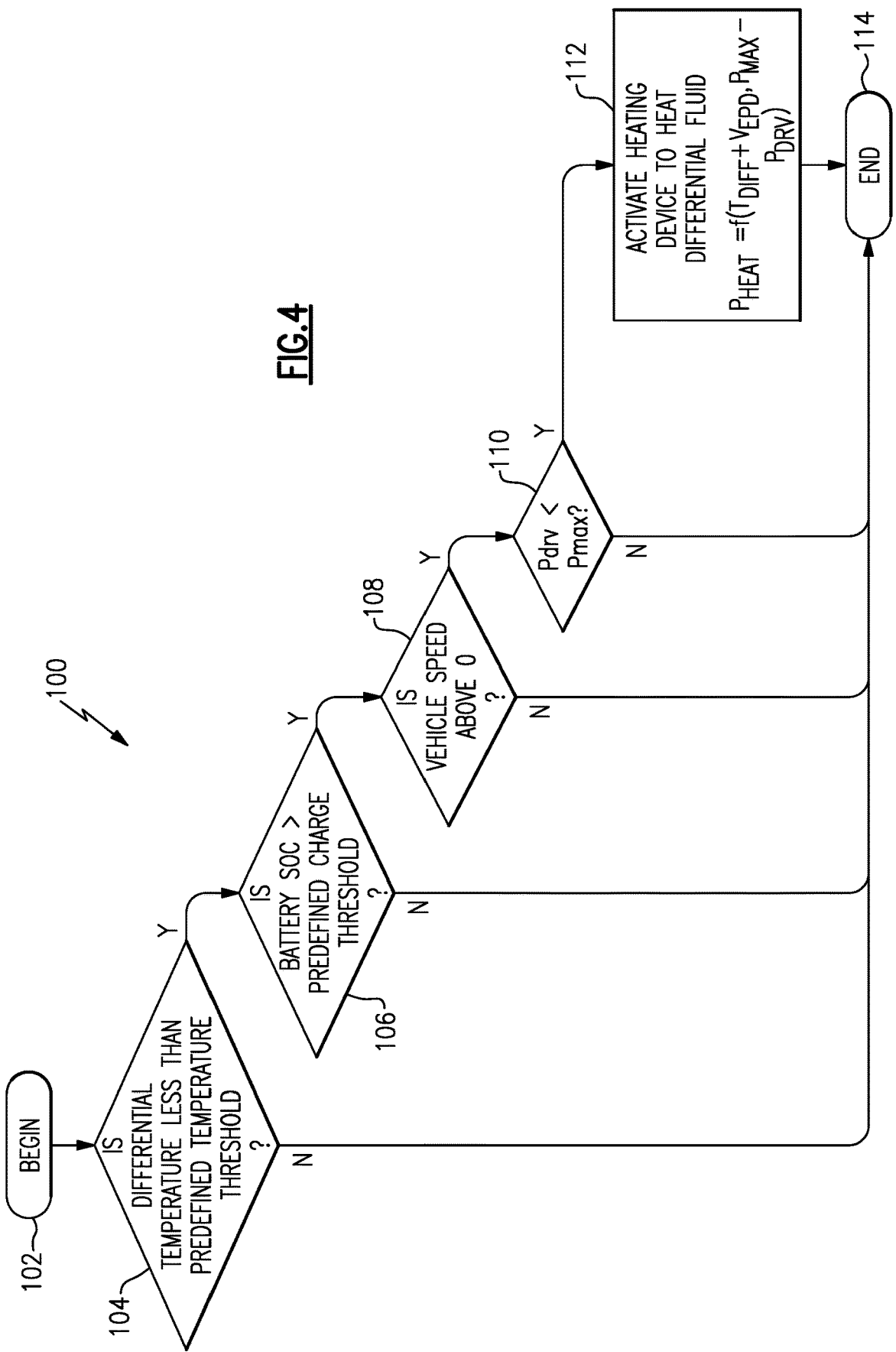
FIG. 4 illustrates an exemplary control strategy for selectively conditioning differential fluid of an electrified vehicle differential.

FIG. 4, with continued reference to FIGS. 1-3, schematically illustrates a control strategy 100 for controlling the vehicle system 60. For example, the control strategy 100 can be performed to warm the differential fluid 62 of the electrified vehicle 10 if certain conditions have been met. The control unit 40 can be programmed with one or more algorithms adapted to execute the control strategy 100, or any other control strategy. In a non-limiting embodiment, the control strategy 100 is stored as executable instructions in the non-transitory memory of the control unit 40.

The control strategy 100 begins at block 102. At block 104, the control strategy 100 confirms whether or not the temperature of the differential 42 is below a predefined temperature threshold. In a non-limiting embodiment, the predefined temperature threshold is set at approximately 15° C. (59° F.). However, the predefined temperature threshold could be set at any temperature and could vary depending on the design of the differential 42, etc.

If the temperature of differential 42 is below the predefined temperature threshold, the control strategy 100 proceeds to block 106 and determines whether or not the SOC of the battery 64 is above a predefined charge threshold. In a non-limiting embodiment, the predefined charge threshold is set at approximately 40% SOC. However, the predefined charge threshold could be set at any SOC percentage and could vary depending on the type of battery 64 used, etc.

The vehicle speed is checked at block 108 if the SOC of the battery 64 is determined to be above a minimum range. Since the differential fluid 62 only circulates while the electrified vehicle 10 is in motion, the control strategy 100 is only performed if the electrified vehicle 10 is moving.

Next, at block 110, assuming block 108 has returned a YES flag, the control strategy 100 confirms whether or not a driver demanded power $P_{drv}$ is below a maximum amount of power available $P_{max}$. This only applies if the battery 64 a high voltage battery that is also used to power an electric machine. Alternatively, if the battery 64 is a low voltage battery, the battery voltage may be compared to a threshold battery voltage at block 110.

The control strategy 100 next proceeds to block 112 if each of blocks 104, 106, 108, and 110 return YES flags. However, if any of blocks 104, 106, 108, or 110 return a NO flag, the control strategy 100 ends at block 114.

The heating device 66 is activated at block 112 to heat the differential fluid 62. Power is supplied to the heating device 66 by the battery 64, in a non-limiting embodiment. The control unit 40 may decide whether or not to activate the heating device 66 as a function of the temperature of the differential 42, the vehicle speed, and the amount of available electrical power. In a non-limiting embodiment, this decision is made by executing an algorithm or by using calibration tables saved in the memory of the control unit 40. Once the differential fluid 62 has been heated to a suitable level, the heating device 66 is deactivated and the control strategy 100 ends at block 114.

Figure 5:
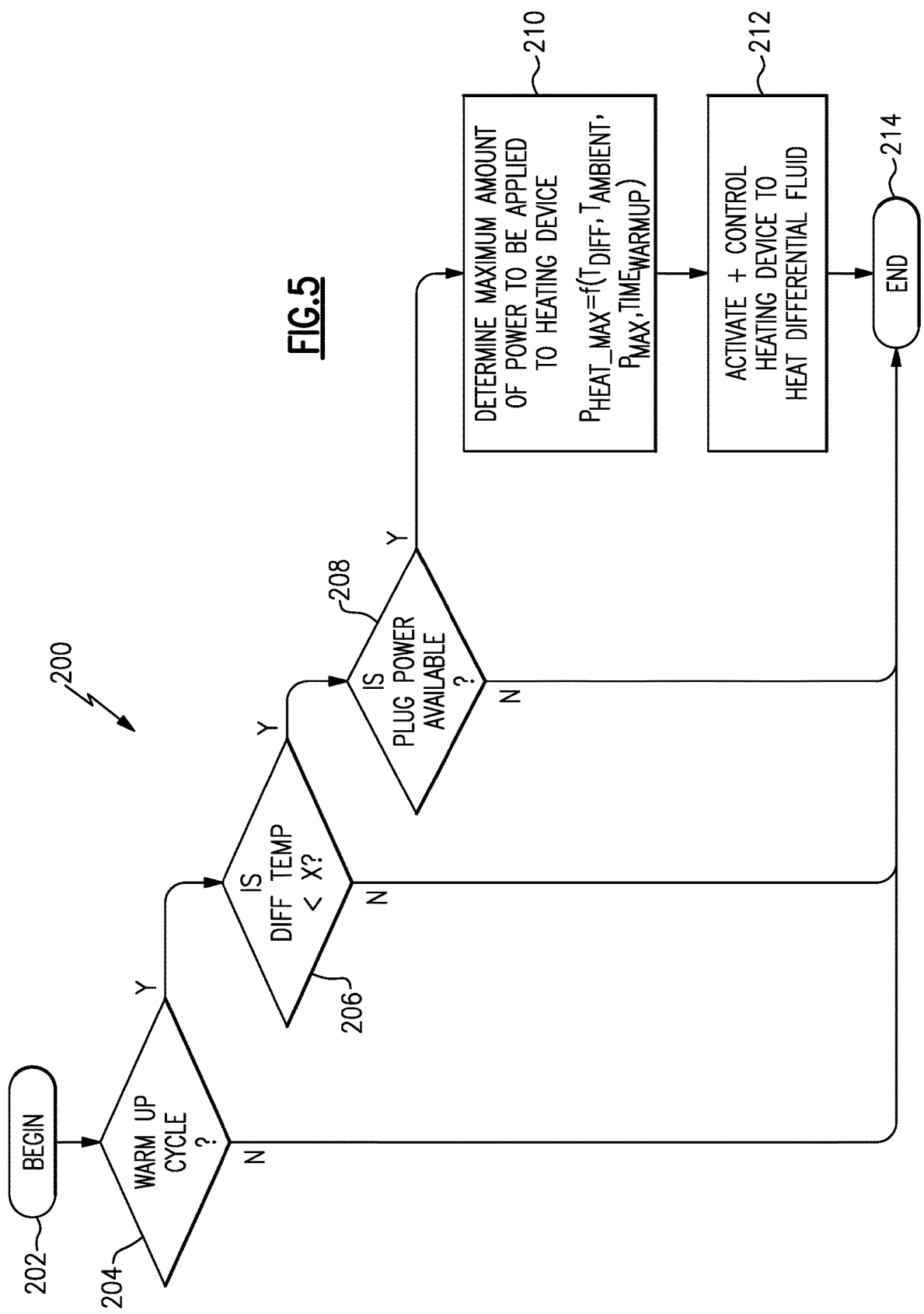
FIG. 5 illustrates another exemplary control strategy for selectively conditioning differential fluid of an electrified vehicle differential.

FIG. 5 illustrates another exemplary control strategy 200 that may be employed for PHEV embodiments of the electrified vehicle 10. The control strategy 200 begins at block 202. At block 204, the control strategy 200 confirms whether or not the electrified vehicle 10 is on-plug and in a pre-drive warm-up cycle. In a non-limiting embodiment, an on-plug condition of the electrified vehicle 10 exists when the electrified vehicle 10 is keyed OFF and the cordset 84 of the charging system 80 is plugged into both the charging port 82 and the external power source 86 and is capable of supplying power. In another non-limiting embodiment, the pre-drive warm-up cycle occurs when it is expected that the driver will soon begin a drive cycle. The duration of the pre-drive warm-up cycle may be pre-programmed by the driver and is typically set-up to execute for 15 minutes to one hour prior to beginning the drive cycle.

If the pre-drive warm-up cycle is confirmed at block 204, the control strategy 200 proceeds to block 206 by confirming whether a temperature of the differential 42 is below a predefined temperature threshold. If YES, the control strategy 200 proceeds to block 208 and determines whether or not plug power is available from the external power source 86 and is sufficient to support warming of the differential fluid 62.

If the differential needs to be heated and there is sufficient power available from the external power source 86, the control strategy 200 proceeds to block 210. However, the control strategy 200 ends if any of blocks 204, 206, or 208 return NO flags.

The maximum amount of power to be applied to the heating device 66 (referred to as $P_{heat\_max}$) is determined at block 210. The control unit 40 may determine the $P_{heat\_max}$ value as a function of ambient temperatures, the temperature of the differential 42, the amount of available electrical power from the external power source 86, and the expected duration of the pre-drive warm-up cycle. In a non-limiting embodiment, this decision is made by executing an algorithm or by using calibration tables saved in the memory of the control unit 40.

Since the electrified vehicle 10 is stationary in this embodiment, there will be no circulation of the differential fluid 62 within the differential 42. For this reason, it is desirable to warm the differential fluid 62 relatively slowly to allow time for the heat to penetrate through the differential 42 and to avoid localized overheating of the differential fluid 62, which could potentially reduce the life of the fluid. Thus, in a non-limiting embodiment, the differential fluid 62 is heated for the duration of the pre-drive warm-up cycle.

Once the $P_{heat\_max}$ value has been determined at block 210, the heating device 66 is activated and controlled at block 212. In a non-limiting embodiment, the heating device 66 is controlled via a variable voltage or fixed voltage duty cycle control to heat the differential fluid 62 at a desired level for a desired amount of time. Once the differential fluid 62 has been heated to a suitable level, the heating device 66 is deactivated and the control strategy 200 ends at block 214.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
a transmission system including a differential; and
an electrically powered heating device mounted to a casing of said differential and configured to selectively warm a differential fluid of said differential.

2. The electrified vehicle as recited in claim 1, wherein said electrically powered heating device is in direct contact with said differential fluid inside said differential.

3. The electrified vehicle as recited in claim 1, wherein said electrically powered heating device includes a positive temperature coefficient (PTC) heater.

4. The electrified vehicle as recited in claim 1, wherein said electrically powered heating device includes an infrared heating device.

5. The electrified vehicle as recited in claim 1, wherein said electrically powered heating device includes a resistive heating device.

6. The electrified vehicle as recited in claim 1, wherein said electrically powered heating device includes a probe that extends into a sump of said differential.

7. The electrified vehicle as recited in claim 1, comprising a control unit configured to selectively command actuation of said electrically powered heating device.

8. The electrified vehicle as recited in claim 1, wherein said electrically powered heating device is powered by grid power.

9. The electrified vehicle as recited in claim 1, wherein said electrically powered heating device is powered by a battery.

10. The electrified vehicle as recited in claim 1, wherein said electrically powered heating device is mounted within a drain plug of said differential.

11. A method, comprising:
selectively powering the electrically powered heating device of claim 1 to generate heat; and
warming the differential fluid of the differential of the electrified vehicle of claim 1 with the heat generated by the electrically powered heating device.

12. The method as recited in claim 11, wherein powering the electrically powered heating device includes powering the electrically powered heating device using a battery of the electrified vehicle.

13. The method as recited in claim 11, wherein powering the electrically powered heating device includes powering the electrically powered heating device using grid power during an on-plug condition of the electrified vehicle.

14. The method as recited in claim 11, wherein warming the differential fluid is continued until a temperature of the differential fluid is within a desired operating temperature range.

15. The method as recited in claim 11, comprising, prior to powering the electrically powered heating device, determining whether a temperature of the differential exceeds a predefined temperature threshold.

16. The method as recited in claim 15, comprising, prior to powering the electrically powered heating device:
determining when a state of charge of a battery exceeds a predefined charge threshold;
determining when a vehicle speed is greater than zero; and
determining when a driver demanded power is below a maximum amount of power available.

17. The method as recited in claim 11, comprising, prior to powering the electrically powered heating device, determining whether the electrified vehicle is on-plug and in a pre-drive warm-up cycle.

18. The method as recited in claim 17, comprising, prior to powering the electrically powered heating device:
determining whether a temperature of the differential exceeds a predefined temperature threshold; and
determining whether power is available from an external power source for powering the electrically powered heating device.

19. The method as recited in claim 18, comprising:
determining a maximum amount of power to be applied to the electrically powered heating device.

20. The method as recited in claim 19, comprising:
controlling the electrically powered heating device via a variable voltage or fixed voltage duty cycle to heat the differential fluid at a desired level for a desired amount of time.

21. An electrified vehicle, comprising:
a transmission system including a differential;
an electrically powered heating device configured to selectively warm a differential fluid of the differential,
wherein the electrically powered heating device includes a probe that extends into a sump of the differential, and the probe is mounted within a drain plug of the differential; and
a control unit configured to selectively activate the electrically powered heating device,
wherein the control unit is configured to activate the electrically powered heating device for warming the differential fluid when the electrified vehicle is in motion as a function of a temperature of the differential, a vehicle speed, and an amount of electrical power available from an on-board battery,
wherein the control unit is configured to control an amount of power applied to the electrically powered heating device for warming the differential fluid when the electrified vehicle is stationary as a function of an ambient temperature, the temperature of the differential, an amount of power available from an external power source, and an expected duration of a pre-drive warm-up cycle of the electrified vehicle.

22. The electrified vehicle as recited in claim 7, wherein the control unit is configured to activate the electrically powered heating device for warming the differential fluid as a function of a temperature of the differential, a vehicle speed, and an amount of electrical power available from an on-board battery.

23. The electrified vehicle as recited in claim 7, wherein the control unit is configured to control an amount of power applied to the electrically powered heating device for warming the differential fluid as a function of an ambient temperature, the temperature of the differential, an amount of power available from an external power source, and an expected duration of a pre-drive warm-up cycle of the electrified vehicle.

24. The electrified vehicle as recited in claim 7, comprising a sensor system configured to monitor a plurality of operating conditions associated with the electrified vehicle, and the control unit is configured to activate the electrically powered heating device based on the plurality of operating conditions.

25. The electrified vehicle as recited in claim 1, wherein the transmission system is a modular hybrid transmission system that further includes an electric machine powered by a high voltage battery, a torque converter, and a gearbox.

26. The electrified vehicle as recited in claim 1, wherein a boss marks the mounting location at which the electrically powered heating device is fitted into the casing of the differential.

* * * * *